United States Patent [19]

Krym et al.

[11] Patent Number: 4,472,800
[45] Date of Patent: Sep. 18, 1984

[54] BINARY SIGNAL RECEIVER FOR TIME COMPRESSION MULTIPLEXING

[75] Inventors: Marvin Krym, Ottawa; William F. McGee, Nepean; both of Canada

[73] Assignee: Northern Telecom Limited, Montreal, Canada

[21] Appl. No.: 403,312

[22] Filed: Jul. 30, 1982

[51] Int. Cl.³ .............................................. H04J 3/00
[52] U.S. Cl. ................................... 370/29; 328/151; 307/353
[58] Field of Search .................. 370/29, 109; 179/170 NC, 81 R, 81 A, 81 B, 81 C, 81 D; 328/151; 307/523, 353

[56] References Cited

U.S. PATENT DOCUMENTS

| | | | |
|---|---|---|---|
| 3,784,921 | 1/1974 | Iadipaolo | 328/151 |
| 4,222,008 | 9/1980 | Mezrich | 328/151 |
| 4,263,521 | 4/1981 | Senger | 328/151 |
| 4,276,539 | 6/1981 | Eshraghian et al. | 328/151 |

Primary Examiner—Douglas W. Olms
Assistant Examiner—Kenneth I. Rokoff
Attorney, Agent, or Firm—Achmed N. Sadik

[57] ABSTRACT

A receive circuit for binary signals in time compression multiplexing systems mitigates effects of the local data decay tail and zero line wander by means of a sample-and-hold circuit, having a fast attack and a decay time constant equal to a combination of the transmission line, and dc blocking device time constants followed by a subtracting difference amplifier. Power feed of the line via dc blocking capacitors is thus possible. Also higher receiver gain is possible when sampling switch is left on during local data transmission without receiver instability.

8 Claims, 6 Drawing Figures

BINARY SIGNAL RECEIVER FOR TIME COMPRESSION MULTIPLEXING

FIELD OF THE INVENTION

The present invention relates to data receivers in general, and to a receiver for time compression multiplexed (TCM) data in particular.

BACKGROUND OF THE INVENTION

In time compression multiplexing (TCM) a single transmission line, say a telephone pair, is utilized for both directions of transmission. The bilaterally transmitted data packets are compressed in time and interleaved. Unlike voice transmission telephony, where on short lines (normally subscriber loops) voice frequency signals are propagating along the line in both directions simultaneously, in TCM a station transmits only after an incoming data packet has cleared the transmission line. Thus transmitter and receiver share the line alternately.

Because the transmission line must be powered to feed the subscriber station, it is necessary to use dc blocking capacitors or transformers to isolate the dc power from the signal transmitter and receiver. It may be advantageous to use capacitors instead of signal transformers due to the smaller size and the lower cost of the former.

Normally the transmission lines will be used in a balanced mode, in order to reduce received common noise, which is rejected by a balanced receiver.

In order to further improve the noise margin, binary signal transmission is preferable to three level signals, for it provides a 6dB advantage.

However, due to the dc blocking capacitance or transformer inductance, certain difficulties arise. The dc blocking component causes an impedance characteristic, which produces the well-known exponential decay tail due to the transmitted waveform. The data being received is superimposed on the decay tail and may go undetected. The length of the tail depends also on the density of data "ones" being transmitted.

Due also the random nature of the transmitted data, baseline wander is also a problem. For the data, passing through two sets of dc blocking capacitors (one set at the transmit side and one set at the receive side), sags until the zero line reaches a level coincident with the data average. As the data stream randomly changes, the base or zero line wanders randomly, also causing detection difficulties. The larger are the dc blocking capacitors, the lesser is the baseline wander, but the longer is the decay tail.

SUMMARY OF THE INVENTION

A possible solution of the problem is to use small dc blocking capacitors to transmit the zero-crossings of the differential data. Unfortunately, the result is a disproportionately large high frequency component in the line signal, where the line exhibits very high losses.

The present invention provides a solution wherein large dc blocking capacitors are used to ensure adequate low frequency contents of the transmitted signal. A sample-and-hold circuit, with a fast attack and with a decay time constant close to that of the transmission line, is then used to recreate the decay tail of the locally generated (transmit) data which is subtracted from the receive data. The result is a restoration of the dc level and a correction for the effects of the decay tail of the transmit data. Thus, according to the present invention, there is provided a binary signal data receiver for time compression multiplexing systems comprising: a balanced-to-unbalanced receive signal converter; sample-and-hold means responsive to the converter; a difference amplifier having two inputs, one responsive to the sample-and-hold means, and the other responsive to the converter; and detector means responsive to the difference amplifier for detecting the receive signal.

The sample-and-hold circuit has a decay time constant approximately equal to that of the combination of the transmission line time constant and dc blocking circuit time constant. And the sampling switch is switched off at the beginning of the receive signal burst, allowing any charges held to decay.

Preferably, the detector means receives only the receive signal burst.

BRIEF DESCRIPTION OF THE DRAWINGS

A preferred embodiment of the present invention will be described in conjunction with the drawings, in which.

DETAILED DESCRIPTION OF THE PREFERRED EMBODIMENT

Figure 1:
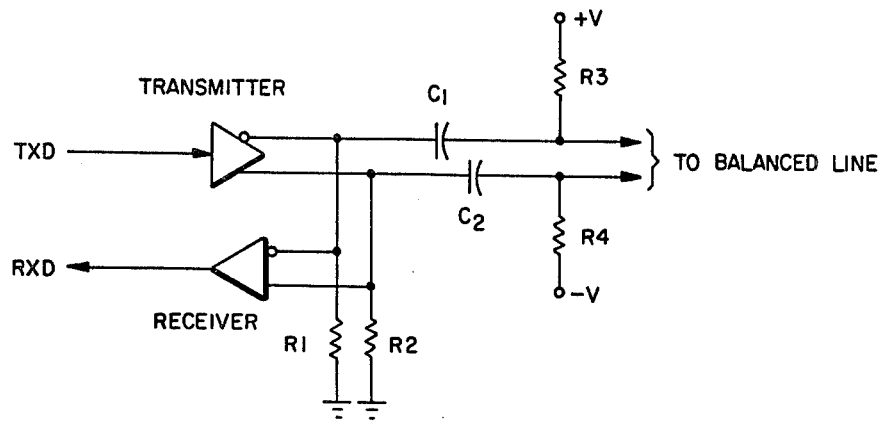
FIG. 1 is a block diagram showing connection of TCM receiver and transmitter to a powered, balanced transmission line.

FIG. 1 of the drawings shows a conventional circuit, with capacitors C1 and C2 being the dc blocking capacitors permitting the balanced line to be powered via resistors R3 and R4, which together with resistors R1 and R2 provide an impedance match to the line.

Figure 2:
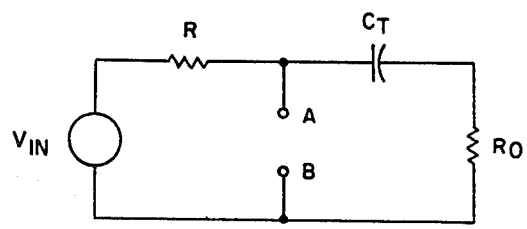
FIG. 2 is the Thevenin unbalanced circuit equivalent of the arrangement in FIG. 1.

The Thevenin equivalent circuit (unbalanced) to the circuit of FIG. 1 is shown in FIG. 2, where resistance R equals $(R_1+R_2)$, resistance $R_0$ equals the line resistance $R_c$ in parallel with $(R_3+R_4)$, $C_T$ equals one-half of $C_1$ or $C_2$ ($C_1=C_2$), and $V_{in}$ is the Thevenin voltage (transmitted signal voltage). In this equivalent circuit the receive date RXD appears between the terminals A-B. The step response S between A-B is given by $$S = 1 - \left[ e^{-\frac{t}{\tau}} \left( \frac{R}{R+R_0} \right) \right], \text{ where}$$

$$\tau = (R + R_0)C_T$$

Thus $C_T$ (i.e., $C_1$ and $C_2$) determines the voltage decay time between A-B. This decaying voltage tail affects the detection of the incoming (receive) data burst, which arrives 25 microseconds after the end of the outgoing (transmit) data burst, assuming a frame time of 125 microseconds and data bursts lasting for 31.25 microseconds in the experimental TCM system. Furthermore, due to the random nature of the data, the base or zero line of the incoming data will wander up and down as the number of "ones" on the line randomly varies.

Figure 3:
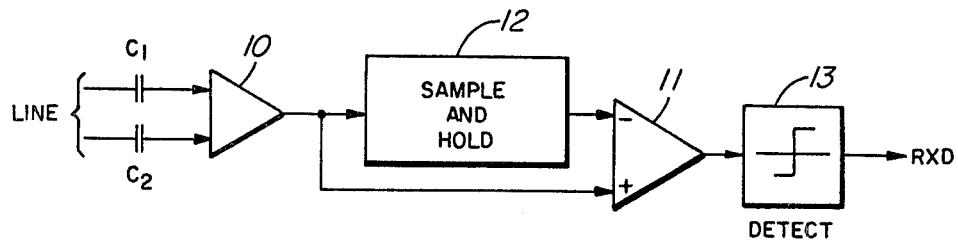
FIG. 3 is a block diagram of a receiver according to the present invention.

FIG. 3 shows the block diagram of a receive circuit according to the present invention. Amplifier 10 coupled to the line via $C_1$ and $C_2$, and serves as a balanced-to-unbalanced converter. The output of the amplifier 10 is coupled to one input of a difference amplifier 11 via a sample-and-hold circuit 12, and to the other input directly. The output of the difference amplifier 11 drives a variable threshold squaring circuit 13, which operates as a pulse detector and shaper and which yields the receive data RXD.

Figure 4:
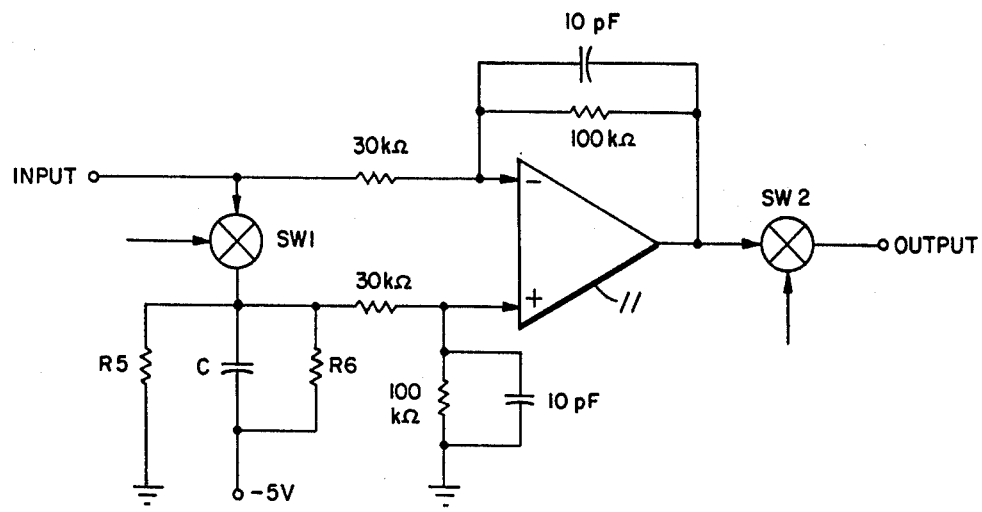
FIG. 4 is a detailed circuit diagram of part of the receiver in FIG. 3.

FIG. 4 shows the detailed circuit for the sample-and-hold circuit 12 and the difference amplifier 11. The output of the amplifier 10 (FIG. 3) drives the inverting input of the amplifier 11 via a 30k ohm resistor directly, while the non-inverting input is connected only periodically through sampling switch SW1, which charges sampling capacitor C (8200 picofarads). The charge on the capacitor C then decays through resistors R5 and R6 (33 and 24k ohm, respectively). The values C, R5 and R6 are chosen to yield a time constant $\tau$ equal to that of the transmission line (in the present case $\tau = 114$ microseconds).

The remainder of the circuit in FIG. 4 is conventional, except for the second switch SW2 which serves to connect the output of the difference amplifier 11 to the detect circuit 13 (FIG. 3) only during receive data bursts in order to reduce leakage of the local transmit data TXD into the detect circuit 13.

The sampling switch SW1 is preferably left on during the full frame period excepting the receive data RXD burst duration. This permits the difference amplifier 11 to have higher gain (10.5dB), since it would otherwise oscillate during the presence of the large local transmit data signal. Thus the receiver may have a total gain of 20dB, with the amplifier 10 (FIG. 3) having 9.5dB gain.

Figure 5A:
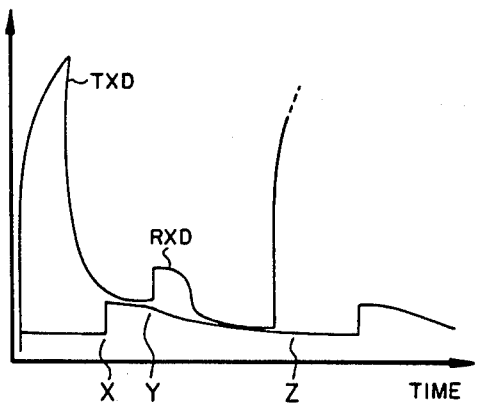
FIGS. 5(a) and 5(b) depict the signals at the input and output, respectively, of the circuit in FIG. 4.

FIG. 5(a) shows the transmit TXD and receive data RXD at the INPUT of the circuit in FIG. 4. The lower curve shows the point X at which the sampling switch SW1 is turned on; as the switch SW1 is turned off at point Y the voltage at the sample and hold circuit 12 output (the inverting input of the amplifier 11) decays (Z) with the time constant $\tau = 114$ microseconds.

Figure 5B:
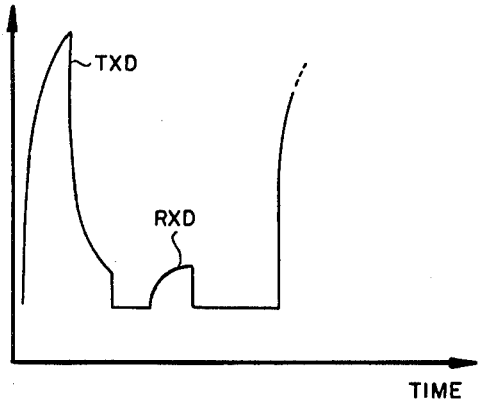

FIG. 5(b) depicts oscilloscope displays of the transmit TXD and receive RXD data at the output of the amplifiers 10 and 11. The switch SW2 passes only the receive data burst RXD on to the detector 13. The switches SW1 and SW2 are steered by the local clock.

What is claimed is:

1. A binary signal data receiver for time compression multiplexing (TCM) systems of the type having a balanced transmission line interconnecting two transceivers comprising:
   a balanced to unbalanced receive signal converter;
   sample-and-hold means responsive to said converter;
   a difference amplifier having two inputs, one responsive to said sample-and-hold means, and the other responsive to said converter;
   detector means responsive to said difference amplifier for detecting said receive signal; and
   said sample-and-hold means comprising a sampling switch and charge holding means having a decay time constant approximately equal to that of the resultant decay time constant of the combination of said transmission line and dc blocking time constants in said TCM system.

2. The receiver as defined in claim 1, said sampling switch being switched off at the beginning of a receive signal to permit decay of any charges held by said charge holding means.

3. The receiver as defined in claims 1 or 2, said detector means being responsive to said difference amplifier only during a receive signal.

4. The receiver as defined in claims 1 or 2, further comprising switch means, between said difference amplifier and said detector means, responsive to the presence of a receive signal.

5. The receiver as defined in claim 1, said sampling switch being on except in the presence of a receive signal.

6. The receiver as defined in claim 5, further comprising means for gating only said receive signal from said difference amplifier to said detector means.

7. The receiver as defined in claim 6, said balanced-to-unbalanced receive signal converter and said difference amplifier being differential operational amplifiers.

8. The receiver as defined in claim 7, wherein said differential operational amplifiers provide each approximately 10dB gain.

* * * * *